United States Patent
Okada et al.

(10) Patent No.: US 11,807,766 B2
(45) Date of Patent: Nov. 7, 2023

(54) ANTI-COUNTERFEIT INK COMPOSITION, ANTI-COUNTERFEIT INK, ANTI-COUNTERFEIT PRINTED MATTER, AND METHOD FOR PRODUCING THE ANTI-COUNTERFEIT INK COMPOSITION

(71) Applicant: SUMITOMO METAL MINING CO., LTD., Tokyo (JP)

(72) Inventors: Mika Okada, Isa (JP); Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 581 days.

(21) Appl. No.: 16/624,078

(22) PCT Filed: Jun. 19, 2018

(86) PCT No.: PCT/JP2018/023319
§ 371 (c)(1),
(2) Date: Feb. 12, 2020

(87) PCT Pub. No.: WO2018/235820
PCT Pub. Date: Dec. 27, 2018

(65) Prior Publication Data
US 2020/0172752 A1  Jun. 4, 2020

(30) Foreign Application Priority Data

Jun. 19, 2017 (WO) .................. PCT/JP2017/022543

(51) Int. Cl.
| | | |
|---|---|---|
| C09D 11/50 | (2014.01) | |
| C08K 3/22 | (2006.01) | |
| C08K 9/02 | (2006.01) | |
| C09D 11/037 | (2014.01) | |
| C09D 11/101 | (2014.01) | |
| B42D 25/382 | (2014.01) | |
| B41M 3/14 | (2006.01) | |

(52) U.S. Cl.
CPC .............. *C09D 11/50* (2013.01); *C08K 3/22* (2013.01); *C08K 9/02* (2013.01); *C09D 11/037* (2013.01); *C09D 11/101* (2013.01); *B41M 3/14* (2013.01); *B42D 25/382* (2014.10); *C08K 2003/2258* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 5,443,579 A | 8/1995 | Tanaka et al. | |
| 10,308,823 B2 | 6/2019 | Okada et al. | |
| 10,370,552 B2 | 8/2019 | Okada et al. | |
| 10,442,948 B2 * | 10/2019 | Okada | C09K 3/00 |
| 2020/0307295 A1 | 10/2020 | Tsunematsu et al. | |

FOREIGN PATENT DOCUMENTS

| | | |
|---|---|---|
| EP | 3 683 604 A1 | 7/2020 |
| JP | H04-320466 A | 11/1992 |
| JP | H05-338388 A | 12/1993 |
| JP | H09-261418 A | 10/1997 |
| JP | 2004-168842 A | 6/2004 |
| JP | 2005-187323 A | 7/2005 |
| JP | 2013-173642 A | 9/2013 |
| JP | 2015-117353 A | 6/2015 |
| WO | 2016/121801 A1 | 8/2016 |
| WO | 2016/121843 A1 | 8/2016 |
| WO | 2016/121844 A1 | 8/2016 |
| WO | 2016/121845 A1 | 8/2016 |
| WO | 2019/054478 A1 | 3/2019 |

OTHER PUBLICATIONS

Feb. 24, 2021 Extended European Search Report issued in European Application No. 18819660.4.
Dec. 24, 2019 International Preliminary Report on Patentability issued in International Patent Application No. PCT/JP2018/023319.
Aug. 7, 2018 Search Report issued in International Patent Application No. PCT/JP2018/023319.
"Building Materials", Special Properties of Nanomaterials, Special Optical Properties, p. 316.

* cited by examiner

*Primary Examiner* — Joshua D Zimmerman
(74) *Attorney, Agent, or Firm* — Oliff PLC

(57) ABSTRACT

There is provided an anti-counterfeit ink composition, an anti-counterfeit ink, and an anti-counterfeit printed matter that transmits a visible light region, having absorption in an infrared region, and capable of judging authenticity of a printed matter, and containing composite tungsten oxide fine particles, the composite tungsten oxide fine particles having a hexagonal crystal structure, having a lattice constant such that a-axis is 7.3850 Å or more and 7.4186 Å or less, and c-axis is 7.5600 Å or more and 7.6240 Å or less, and having a particle size of the near-infrared absorbing material fine particles is 100 nm or less, and a method for producing the anti-counterfeit ink composition, the anti-counterfeit ink, the anti-counterfeit printed matter, and the anti-counterfeit ink composition.

11 Claims, No Drawings

ANTI-COUNTERFEIT INK COMPOSITION, ANTI-COUNTERFEIT INK, ANTI-COUNTERFEIT PRINTED MATTER, AND METHOD FOR PRODUCING THE ANTI-COUNTERFEIT INK COMPOSITION

TECHNICAL FIELD

The present invention relates to an anti-counterfeit ink composition, an anti-counterfeit ink, an anti-counterfeit printed matter utilizing absorption of light in a near-infrared region, and a method for producing the anti-counterfeit ink composition.

DESCRIPTION OF RELATED ART

Conventionally, for valuable printed matters such as bankbooks and identification cards of deposits and savings, credit cards, cash cards, checks, air tickets, road pass tickets, tickets, prepaid cards, gift certificates, and securities, etc., special efforts have been made on a substrate and the printing method as a method for preventing counterfeiting.

For example, special printing in which a watermark is placed on a substrate (see Patent Document 1), printing of a fine pattern (see Patent Document 2), digital processing using geometric shape printing typified by a bar code, and the like are performed. However, cost of a paper with special watermarked printing is high, and barcode printing can easily be counterfeited by copying or the like. Further, for printing of a fine pattern, improvement of an image processing technology of a current color copy machine and a computer is required, and an ambiguous element of confirmation by human eye is added, and therefore the anti-counterfeit effect is low and it is not universal.

As an anti-counterfeit method other than the above, there is proposed a method for detecting authenticity information of the printed matter by using a printing ink that absorbs near infrared rays having a wavelength from 800 to 2400 nm with little absorption in a visible light region of a wavelength of 300 to 780 nm. For example, in the case of printing with an ink prepared by mixing near-infrared absorbing fine particles having little absorption in the visible light region and a binder resin, only specific wavelengths are absorbed when a printed surface is irradiated with an infrared laser, and therefore by reading reflected or transmitted light, authenticity can be judged.

Anti-counterfeit ink using a phthalocyanine compound has been proposed as such a printing ink that absorbs near-infrared rays (see Patent Document 3). However, the phthalocyanine compounds, which are near-infrared absorbing materials, have a disadvantage that they are inferior in weather resistance because their absorption properties are reduced by an influence of temperature, ultraviolet rays, and the like.

Meanwhile, a dispersion film containing hexaboride fine particles such as Y and La, ruthenium oxide fine particles and the like is known as a solar radiation absorbing film for insulating near-infrared rays of sunlight, and an idea of applying this film to an anti-counterfeit ink has been proposed (see Patent Document 4). However, when the solar radiation absorbing film is applied to the anti-counterfeit ink, a contrast of absorption of light with respect to transmission or reflection of light not sufficient in a wavelength region that transmits or reflects light, and a wavelength region that absorbs light when used for coating, and therefore a reading precision and the like when used as the anti-counterfeit ink is sometimes deteriorated depending on the application.

Therefore, the present applicant discloses an anti-counterfeit ink containing composite tungsten oxide fine particles having a high contrast between the absorption in the near infrared region, and transmission or reflection in the visible light region, and excellent in weather resistance as compared with conventional materials see Patent Document 5).

PRIOR ART DOCUMENT

Patent Document

[Patent Document 1] Japanese Patent Application Laid-Open No. 1997-261418
[Patent Document 2] Japanese Patent Application Laid-Open No. 1993-338388
[Patent Document 3] Japanese Patent Application Laid-Open No. 1992-320466
[Patent Document 4] Japanese Patent Application Laid-Open No. 2004-168842
[Patent Document 5] Japanese Patent Application Laid-Open No. 2015-117353

SUMMARY OF THE INVENTION

Problem to be Solved by the Invention

However, even in a case of the anti-counterfeit ink containing the composite tungsten oxide fine particles disclosed in Patent Document 5, the near-infrared absorption property is insufficient, and the expression of the contrast is insufficient in some cases.

In view of such a conventional circumstance, the present invention is provided, and an object of the present invention is to provide the anti-counterfeit ink composition, the anti-counterfeit ink, and the anti-counterfeit printed matter capable of judging authenticity of the printed matter using the near-infrared absorbing fine particles that transmit the visible light region and having absorption in the near-infrared region, and a method for producing the anti-counterfeit ink.

Means for Solving the Problem

In order to solve the above-described problem, and as a result of intensive studies, the present inventors found a configuration in which the composite tungsten oxide fine particles as a near-infrared absorbing material have a lattice constant such that a-axis is 7.3850 Å or more and 7.4186 Å or less, and c-axis is 7.5600 Å or more and 7.6240 Å or less. Thus, the present invention is completed.

In order to achieve the above-described object, a first invention is an anti-counterfeit ink composition containing composite tungsten oxide fine particles, wherein a lattice constant of the composite tungsten oxide fine particles is such that the a-axis is 7.3850 Å or more and 7.4186 Å or less, and the c-axis is 7.5600 Å or more and 7.6240 Å or less.

A second invention is the anti-counterfeit ink composition of the first invention, wherein the lattice constant of the composite tungsten oxide fine particles is sue at the a-axis is 7.431 Å or more and 7.4111 Å or less, and the c-axis is 7.5891 Å or more and 7.6240 Å or less.

A third invention is the anti-counterfeit ink composition of the first invention or the second invention, wherein the composite tungsten oxide fine particles are composite tungsten oxide having a hexagonal crystal structure expressed by MxWyOz (wherein M is an element of one or more kinds selected from H, He alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.2 \leq z/y \leq 3.0$).

A fourth invention is the anti-counterfeit ink composition of any one of the first to third inventions, wherein a crystallite size of each composite tungsten oxide fine particle is 1 nm or more and 200 nm or less.

A fifth invention the anti-counterfeit ink composition of any one of the first to fourth inventions, wherein a surface of each composite tungsten oxide fine particle is coated with a compound containing at least one element selected from Si, Ti, Al and Zr.

A sixth invention is the anti-counterfeit ink composition of any one of the first to fifth inventions, wherein a content of a volatile component of the composite tungsten oxide fine particles is 2.5 mass % or less.

A seventh invention is the anti-counterfeit ink composition of any one of the first to sixth inventions, which contains a solvent, and/or a liquid uncured material of resin curable by energy rays.

An eighth invention is an anti-counterfeit ink containing the anti-counterfeit ink composition of any one of the first to seventh inventions.

A ninth invention is an anti-counterfeit printed matter including a printing section printed with the anti-counterfeit ink of the eighth invention.

A tenth invention is the anti-counterfeit printed matter of the ninth invention containing an organic binder.

An eleventh invention is a method for producing an anti-counterfeit ink composition containing composite tungsten oxide fine particles, a solvent and/or a liquid uncured material of resin curable by energy rays, wherein composite tungsten oxide fine particles are dispersed in the solvent and/or the liquid uncured material of resin curable by the energy rays, the particles having a lattice constant such that a-axis is 7.3850 Å or more and 7.4186 Å or less, and c-axis is 7.5600 mm or more and 7.6240 mm or less.

A twelfth invention is a method for producing an anti-counterfeit ink composition containing composite tungsten oxide fine particles, a solvent and/or a liquid uncured material of resin curable by energy rays, the method including:

producing by firing the composite tungsten oxide particles so that its lattice constant is in a range of 7.3850 Å or more and 7.4186 Å or less for a-axis, and 7.5600 Å or more and 7.6240 Å or less for c-axis; and adding the produced composite tungsten oxide fine particles into a liquid uncured product of a resin that is cured with the solvent, and/or the energy rays, while maintaining the range of the lattice constant.

A thirteenth invention is the method for producing an anti-counterfeit ink composition of the eleventh or twelfth invention, wherein the composite tungsten oxide fine particles are composite tungsten oxide having a hexagonal crystal structure expressed by MxWyOz (wherein M is an element of one or more kinds selected from He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, R, Be, Hf, Os, Bi, I, and Yb, W is tungsten, O is oxygen, satisfying $0.001 \leq x/y \leq 1$, $2.2 \leq z/y \leq 3.0$).

A fourteenth invention is the method for producing an anti-counterfeit ink composition of any one of the eleventh to thirteenth inventions, wherein a crystallite size of each composite tungsten oxide fine particle is 1 nm or more and 200 nm or less.

A fifteenth invention is the method for producing an anti-counterfeit ink composition of any one of the eleventh to fifteenth inventions, wherein a surface of each composite tungsten oxide fine particle is coated with a compound containing at least one element selected from Si, Ti, Al, and Zr.

A sixteenth invention is the method for producing an anti-counterfeit ink composition of any one of the eleventh to fifteenth inventions, wherein a content of a volatile component in the composite tungsten oxide fine particles is 2.5 mass % or less.

Advantage of the Invention

By using an anti-counterfeit composition and an anti-counterfeit ink of the present invention, it is possible to provide an anti-counterfeit printed matter that cannot be duplicated by copying, etc. capable of mechanically, easily, and reliably judging authenticity regardless of visual judgment, and excellent in weather resistance and light resistance, by using the an counterfeit ink composition and the anti-counterfeit ink of the present invention. Then, according to the method for producing the anti-counterfeit ink composition and the method for producing an anti-counterfeit ink of the present invention, the anti-counterfeit ink composition and the anti-counterfeit ink that transmit light in the visible light region, having absorption in the near infrared region, and excellent in securing contrast between the visible light region and the near-infrared region, can be produced with high productivity.

DETAILED DESCRIPTION OF THE INVENTION

An anti-counterfeit ink composition of the present invention is an anti-counterfeit ink composition containing composite tungsten oxide fine particles, wherein the composite tungsten oxide fine particles have a hexagonal crystal structure, and have a-axis of 7.3850 Å or more and 7.4186 Å or less, and c-axis of 7.5600 mm or more and 7.6240 mm or less in lattice constant.

The anti-counterfeit ink composition of the present invention contains a solvent, and or a liquid uncured material of resin curable by energy rays.

Further, the anti-counterfeit ink of the present invention is obtained by adding desired organic binder, pigment, dye, and various desired additives to the anti-counterfeit ink composition.

Further, the anti-counterfeit printed matter of the present invention can be obtained by coating or printing the surface of a substrate to be printed with the anti-counterfeit ink by an ordinary method. In this case, the anti-counterfeit printed matter can be formed by removing the solvent in the anti-counterfeit ink by evaporation or the like to fix it to the surface of the substrate to be printed, and by c liquid uncured material of resin curable by energy rays under irradiation of the energy rays, and fixing it to the substrate to be printed.

Embodiments of the present invention will be described hereafter in an order of [a] Composite tungsten oxide fine particles, [b] Method for producing the composite tungsten oxide fine particles, [c] Volatile component of the composite tungsten oxide fine particles and drying treatment method therefore. [d] Anti-counterfeit ink composition and anti-counterfeit ink, [e] Method for producing the anti-counterfeit ink composition and producing the anti-counterfeit ink, [f] Anti-counterfeit printed matter, and [g] Near-infrared absorption effect of anti-counterfeit printed matter.

[a] Composite Tungsten Oxide Fine Particles

In the present invention, the near-infrared absorbing fine particles used in the anti-counterfeit ink composition, the anti-counterfeit ink, and the anti-counterfeit printed matter are composite tungsten oxide fine particles having a lattice constant such that the a-axis is 7.3850 Å or more and 7.4186 Å or less and the c-axis is 7.5600 Å or more and 7.6240 Å or less, and preferably the a-axis is 7.4031 Å or more and 7.4111 Å or less, and the c-axis is 7.5891 Å or more and 7.6240 Å or less.

Further, the value of the ratio of (c-axis lattice constant/a-axis lattice constant) is preferably 1.0221 or more and 1.0289 or less.

Further, the composite tungsten oxide preferably includes a hexagonal crystal structure.

Since the composite tungsten oxide has the above predetermined lattice constant, the anti-counterfeit ink composition, the anti-counterfeit ink, and the anti-counterfeit printed matter have a light transmittance having a local maximum value in a wavelength range from 350 nm to 600 nm and a local minimum value in a wavelength range from 800 to 2100 nm. More specifically, the wavelength range where the local maximum value and the local minimum value occur will be described. The local maximum value occurs in the wavelength range of 440 to 600 nm, and the local minimum value occurs in the wavelength range of 1150 to 2100 nm. Namely, the local maximum value of the transmittance occurs in a visible light region, and the local minimum value of the transmittance occurs in a near-infrared region.

A detailed reason is still under study why the near-infrared absorbing material fine particles according to the present invention, with the composite tungsten oxide having the above predetermined lattice constant, exhibits excellent optical properties. Here, the present inventors conducted research and considered as follows.

Generally, since there are no effective free electrons in tungsten trioxide ($WO_3$), absorption and reflection properties in the near-infrared region are small, and the tungsten trioxide is not effective as an infrared absorbing material. Here, it is known that free electrons are generated in the tungsten oxide by setting a ratio of oxygen to tungsten in the tungsten trioxide to be smaller than 3. However, the present inventors found a fact that there is a particularly effective range as a near-infrared absorbing material in a specific part of a composition range of tungsten and oxygen in the tungsten oxide.

As the composition range of tungsten and oxygen, the composition ratio of oxygen to tungsten is preferably 3 or less, more preferably $2.2 \leq z/y \leq 2.999$ when the tungsten oxide is expressed as $WyOz$. This is because if the value of $z/y$ is 2.2 or more, it is possible to avoid an appearance of a $WO_2$ crystal phase in the tungsten oxide, other than an intended purpose, possible to obtain chemical stability as a material, and possible to be applied as an effective near d absorbing material. On the other hand, if the value of $z/y$ is 2.999 or less, a required amount of free electrons is generated in the tungsten oxide, and an efficient near-infrared absorbing material is obtained.

Further, in the tungsten oxide fine particles obtained by pulverizing the tungsten oxide, a so-called "Magneli phase" having a composition ratio represented by $2.45 \leq z/y \leq 2.999$ is chemically stable when expressed as a general formula $WyOz$, and an absorption property in the near-infrared region is good. Therefore, the tungsten oxide fine particles are preferable as a near-infrared absorbing material.

Further, it is also preferable to add M element to the tungsten oxide to obtain the composite tungsten oxide. This is because by adopting this configuration, free electrons are generated in the composite tungsten oxide, and the absorption property derived from the free electrons are expressed in the near-infrared region, and the composite tungsten oxide becomes effective as a near-infrared absorbing material around a wavelength of 1000 nm.

Here, in the composite tungsten oxide to which M element is added, the M element is preferably one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, Mo, I a, Re, Be, Hf, Os, Bi, I, from a viewpoint of stability.

For the composite tungsten oxide, since the above-described control of the amount of oxygen and the addition of an element that generates free electrons are used in combination, a more efficient near-infrared absorbing material can be obtained. A general formula of the near-infrared absorbing material in which control of the amount of oxygen and the addition of an element that generates free electrons are used in combination, is expressed as $MxWyOz$ (where M element is the M element, W is tungsten, and O is oxygen), wherein a relationship of $0.001 \leq x/y \leq 1$, preferably $0.20 \leq x/y \leq 0.37$ is satisfied.

Here, in $MxWyOz$ to which the M element is added, the element M is preferably one or more kinds selected from alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re from a viewpoint of stability, and more preferably, the M element belongs to an alkali metal, alkaline earth metal element, transition metal element, 4B group element, or 5B group element from a viewpoint of improving optical properties and weather resistance as a near-infrared absorbing material.

Next, the value of $z/y$ indicating a control of an oxygen amount will be described. The value of $z/y$ is preferably $2.2 \leq z/y \leq 3.0$, because the same mechanism as the near-infrared absorbing material represented by $WyOz$ described above works, and in addition, even at $z/y=3.0$, there is a supply of the free electrons due to the addition amount of the M element described above.

Further, when the above composite tungsten oxide fine particles have a hexagonal crystal structure, the transmittance of the fine particles in the visible light region is improved, and the absorption thereof in the near-infrared region is improved. In this hexagonal crystal structure, a hexagonal void (tunnels) is formed by assembling six hexahedrons formed by units of $WO_6$. Then, the M element is arranged in the void to constitute one unit, and a large number of these units gather to form a hexagonal crystal structure.

According to the present invention, in order to improve the transmission in the visible light region and improve the absorption in the near infrared region, it is sufficient that the unit structure (a structure in which hexagonal voids are formed by assembling six octahedrons formed by $WO_6$ units and M elements are arranged in the voids) is contained in the composite tungsten oxide fine particles.

When the cation of the M element is added to the hexagonal void, the absorption in the near infrared region is improved. Here, generally, when the M element having a large ion radius is added, the hexagonal crystal is formed. Specifically, when one or more selected from Cs, Rb, K, Tl, In, Ba, Li, Ca, Sr, and Sn are added, the hexagonal crystal is easily formed, which is preferable.

Further, in the composite tungsten oxide fine particles to which one or more selected from Cs and Rb are added among the M elements having a large ion radius, both absorption in the near infrared region and transmission in the visible light region can be achieved.

In the case of Cs tungsten oxide fine particles in which Cs is selected as the M element, the lattice constant thereof is preferably such that the a-axis is 7.4031 or more and 7.4186 or less and the c-axis is 7.5750 or more and 7.6240 or less.

In the case of Rb tungsten oxide fine particles in which Rb is selected as the M element, it is preferable that the lattice constant thereof is such that the a-axis is 7.385 or more and 7.3950 or less and the c-axis is 7.5600 or more and 7.5700 or less.

In the case of CsRb tungsten oxide fine particles in which Cs and Rb are selected as the M element, it is preferable that the lattice constant thereof is such that the a-axis is 7.3850 mm or more and 7.4186 mm or less and the c-axis is 7.5600 mm or more and 7.6240 mm or less.

However, the M element is not limited to the above Cs and Rb. Even if the M element is an element other than Cs or Rb, it may be present as an added M element in the hexagonal void formed by the units of $WO_6$.

When the composite tungsten oxide fine particles having the hexagonal crystal structure have a uniform crystal structure, the amount of the added M element is $0.001 \leq x/y \leq 1$, preferably $0.2 \leq x/y \leq 0.5$, more preferably $0.20 \leq x/y \leq 0.37$, most preferably $x/y=0.33$. This is because theoretically, when satisfying $z/y=3$, $x/y=0.33$ is established, and the added M element is considered to be arranged in all hexagonal voids.

Here, the present inventors have repeatedly studied in consideration of further improving the near infrared absorption function of the composite tungsten oxide fine particles, and have achieved a configuration in which the amount of the contained free electrons is further increased.

Namely, as a measure to increase the amount of the free electrons, the inventors have achieved a configuration in which a mechanical treatment is applied to the composite tungsten oxide fine particles to give appropriate strain and deformation to the contained hexagonal crystals. In the hexagonal crystal given the appropriate strain and deformation, it is considered that the amount of the free electrons increases due to a change in an overlapping state of electron orbitals in the atoms constituting the crystallite structure.

Therefore, the inventors have studied as follows: in a dispersion step when producing the near-infrared absorbing material fine particle dispersion liquid from the fine particles of the composite tungsten oxide produced by a firing step, the fine particles of the composite tungsten oxide are pulverized under predetermined conditions, thereby giving strain and deformation to the crystal structure and increasing the amount of the free electrons, and the near-infrared absorption function of the composite tungsten oxide particles is further improved.

From the above study, the inventors have paid attention to each fine particle of the composite tungsten oxide produced through the firing step. Then, it is found that there are variations in both the lattice constant and a constituent element composition among the fine particles.

As a result of further study, it is found that in the final composite tungsten oxide fine particles, if the lattice constant is within a predetermined range, desired optical properties are exhibited irrespective of the variations in the lattice constant and the constituent element composition among the fine particles.

The present inventors who have obtained the above-described findings have further studied regarding the optical properties exhibited by the fine particles, while grasping a degree of the strain and the deformation of the crystal structure of the fine particles by measuring the a-axis and the c-axis which are lattice constants in the crystal structure of the composite tungsten oxide fine particles.

Then, as a result of the above study, it is found that in the hexagonal composite tungsten oxide fine particles, the transmittance having a local maximum value in a wavelength range from 350 nm to 600 nm and a local minimum value in a wavelength range from 800 to 2100 nm is exhibited when the a-axis is 7.3850 mm or more and 7.4186 mm or less and the c-axis is 7.5600 mm or more and 7.6240 mm or less, and the near-infrared absorbing material fine particles exhibit excellent near-infrared absorbing effect. Thus, the present invention is completed.

Further, it is also found that in the hexagonal composite tungsten oxide fine particles in which the near-infrared absorbing material fine particles the present invention has the lattice constant such that the a-axis is 7.3850 Å or more and 7.4186 Å or less and the c-axis is 7.5600 Å or more and 7.6240 Å or less, particularly excellent near-infrared absorption effect is exhibited when the value of x/y indicating the added amount of the M element is in the range of $0.20 \leq x/y \leq 0.37$.

Specifically, the anti-counterfeit ink composition and the anti-counterfeit ink in which fine particles of near-infrared absorbing material according to the present invention are dispersed in a r medium and having a transmittance of 70% or more at a wavelength of 550 nm, exhibits a transmit having a local maximum value in the wavelength from 350 nm to 600 nm and a local minimum value in the wavelength range from 800 nm to 2100 nm. Then, it is found that the anti-counterfeit ink composition and the anti-counterfeit ink exhibit particularly excellent optical properties when the local maximum value (%)–the local minimum value (%)≥69 (points), that is, the difference between the local maximum value and the local minimum value is 69 points or more in percentage.

Further, the near-infrared absorbing material fine particles according to the present invention preferably have a particle size of 10 nm to 200 nm. Then, from viewpoint of exhibiting more excellent near-infrared absorption properties, the particle size is more preferably 100 or less, further preferably 10 nm or more and 80 nm or less, and most preferably 10 nm or more and 60 nm or less. When the particle size is in the range of 10 nm or more and 60 nm or less, the most excellent infrared absorption properties are exhibited.

Here, the particle size is an average value of the sizes of the individual near-infrared absorbing material fine particles not aggregated, and is an average particle size of the near-infrared absorbing material fine particles contained in the anti-counterfeit ink composition and the anti-counterfeit k described later.

On the other hand, the particle size does not include the size of the aggregate of the composite tungsten oxide fine particles, and is different from the dispersed particle size.

The average particle size is calculated from an electron microscope image of the near-infrared absorbing material fine particles.

The average particle size of the composite tungsten oxide fine particles contained in the anti-counterfeit ink composition and the anti-counterfeit ink can be obtained by measuring the particle size of 100 composite tungsten oxide fine particles using an image processing device and calculating the average value thereof, from a transmission electron microscope image of thinned samples of the composite tungsten oxide particles takers out by cross-section processing. A microtome, a cross section polisher, a focused ion beam (FIB) apparatus, or the like can be used for cross-section processing for taking out the thinned samples. The average particle size of the composite tungsten oxide fine particles contained in the anti-counterfeit ink composition and the anti-counterfeit ink is the average value of the particle sizes of the composite tungsten oxide fine particles dispersed in a matrix medium.

Further, from a viewpoint of exhibiting excellent near-infrared absorption properties, the crystallite size of the composite tungsten oxide fine particles is preferably 1 nm or more and 200 nm or less, more preferably 10 nm or more and 200 nm or less, further preferably 100 nm or less, more preferably, 10 nm or more and 80 nm or less, and most preferably 10 nm or more and 60 nm or less. This is because if the crystallite size is in the range of 10 nm or more 60 nm or less, the most excellent infrared absorption properties are exhibited.

The lattice constant and crystallite size of the composite tungsten oxide fine particles contained in the composite tungsten oxide fine particle dispersion liquid obtained after disintegration treatment, pulverization treatment, or dispersion treatment described later are maintained even in the composite tungsten oxide fine particles obtained by removing volatile components from the composite tungsten oxide fine particle dispersion liquid, even in the anti-counterfeit ink composition obtained from the composite tungsten oxide fine particle dispersion liquid, and even in the composite tungsten oxide fine particles contained in the anti-counterfeit ink.

As a result, the effect of the present invention is also exhibited in the composite tungsten oxide fine particle dispersion liquid and the anti-counterfeit ink composition and the anti-counterfeit ink containing the composite tungsten oxide fine particles according to the present invention.

Further, in the composite tungsten oxide fine particles as the near-infrared absorbing material fine particles, a single crystal whose amorphous phase volume ratio is 50% or less is preferable.

This is because when the composite tungsten oxide fine particles are single crystals having the amorphous phase volume ratio of 50% or less, the crystallite size can be 10 nm or more and 100 mu or less while maintaining the lattice constant within the above-described predetermined range.

In contrast, there is a case that the composite tungsten oxide fine particles have a particle size of 100 nm or less, but the amorphous phase is present in a volume ratio exceeding 50%, or a case that the lattice constant cannot be maintained within the predetermined range described above when the fine particles are polycrystalline. In this case, 69 points or more cannot be ensured in the difference between the local maximum value of the light transmittance present in the wavelength range from 350 nm to 600 nm and the local minimum value of the light transmittance present in the wavelength range from 800 nm to 2100 nm in percentage. As a result, the near-infrared absorption properties are insufficient, and the near infrared absorption properties are not sufficiently expressed.

The fact that the composite tungsten oxide fine particles are single crystals can be confirmed from an electron microscope image by transmission electron microscope in which no grain boundaries are observed inside each fine particle, and only uniforms lattice fringes are observed. Further, the fact that the volume ratio of the amorphous phase volume ratio is 50% or less in the composite tungsten oxide fine particles can be confirmed from the same electron microscope image by transmission electron microscope in which uniform lattice fringes are observed throughout the fine particles, and there are almost no unclear spots.

Further, since the amorphous phase is often present on an outer periphery of each fine particle, the amorphous phase volume ratio can be calculated by paying attention to the outer periphery of each fine particle in many cases. For example, in the spherical composite tungsten oxide fine particles, when the amorphous phase with unclear lattice fringes exists in a layered manner on the outer periphery of the fine particles in a thickness of 10% or less of the particle size, the volume ratio of the amorphous phase in the composite tungsten oxide fine particles is 50% or less.

On the other hand, when the composite tungsten oxide fine particles are dispersed in the medium constituting the anti-counterfeit ink composition and the anti-counterfeit ink, the composite tungsten oxide fine particles can be said to be a single crystal having the amorphous phase volume ratio of 50% or less, as long as the value obtained by subtracting the crystallite size from the average particle size of the dispersed composite tungsten oxide fine particles is 20% or less of the average particle size.

As described above, synthesis, pulverization, and dispersion may be suitably performed depending on production equipment, so that the difference between the average particle size and the crystallite size of the composite tungsten oxide fine particles dispersed in anti-counterfeit printed matter of the present invention is 20% or less.

It is preferable that the surface of the fine particles constituting the infrared absorbing material of the present invention is coated with an oxide containing one or more of SI, Ti, Zr, and Al, from a viewpoint of improving the weather resistance of the infrared absorbing material.

Further, the transmission properties of the composite tungsten oxide fine particles are also changed depending on the particle size of the fine particle. Namely, the smaller the particle size of the fine particle is, the greater the difference in transmittance, becomes between the peak of the transmittance in the visible light region and the bottom of the absorption in the near infrared region. On the contrary, when the particle size is large, the difference in transmittance becomes small, and the absorption of the near-infrared ray is decreased with respect to the peak of a visible light transmit Therefore, it is desirable that the particle size of the fin particle is appropriately set according to the intended use method or the like.

Further, when it is desired to maintain the transparency of a transparent substrate used as a substrate to be printed, or when it is desired to maintain the transparency that allows a base printing to be seen through or the like, a smaller particle size of the composite tungsten oxide fine particles is preferable. Particularly, in a case of the anti-counterfeit printing which emphasizes transparency in the visible light region, it is necessary to consider light scattering due to the fine particles. This is because when the dispersed particle size of the fine particles is smaller than 200 nm, light in the visible light region having a wavelength of 400 to 780 nm is not scattered due to scattering by geometry or Mie scattering, and therefore the anti-counterfeit printed matter does not look like semi-foggy glass, and clear transparency can be obtained.

Further, when clear transparency is required for the anti-counterfeit printed matter, the dispersed particle size of the fine particle in the anti-counterfeit ink composition is preferably 200 nm or less, and more preferably 100 nm or less. When the dispersed particle size becomes 200 nm or less, light scattering is reduced to become a Rayleigh scattering region, and the scattered light educed in proportion to the particle size of the sixth power, and therefore transparency is improved as the particle size is decreased. Further, when the dispersed particle size becomes 100 nm or less, the scattered light is extremely reduced, which is more preferable. Further, even in the case of the near-infrared ray, scattering is reduced by decreasing the particle: size, and absorption efficiency is increased, which is preferable.

Meanwhile, if the particle size is 10 nm or more, the above light resistance can be ensured.

The dispersed particle size of each composite tungsten oxide fine particle in the anti-counterfeit ink composition and anti-counterfeit ink, and the average particle size of the composite tungsten oxide fine particles dispersed in the anti-counterfeit printed matter, are different in some cases. This is because even if the composite tungsten oxide fine particles are aggregated in the anti-counterfeit ink composition or the like, aggregation of the composite tungsten oxide fine particles is resolved when being processed into the anti-counterfeit printed matter.

[b] Method for Producing the Composite Tungsten Oxide Fine Particles

The composite tungsten oxide fine particles expressed by the general $M_xW_yO_z$ of the present invention, can be produced by a solid phase reaction method of applying heat treatment to a tungsten compound as a starting material for the tungsten oxide fine particles in a reducing gas atmosphere, a mixed gas atmosphere of a reducing gas and an inert gas, or an inert gas atmosphere. After passing through the heat treatment, the composite tungsten oxide fine particles obtained by being made finer by pulverization treatment or the like so as to have a predetermined particle size, have sufficient near-infrared absorbing power and have preferable properties as near-infrared shielding fine particles.

As a starting material for obtaining the composite tungsten oxide fine particles expressed by the above general formula $M_xW_yO_z$ of the present invention, it is possible to use a mixed powder at a ratio of $0.20 \leq x/y \leq 0.37$, the mixed powder being one or more powder selected from tungsten trioxide powder, tungsten dioxide powder, or a hydrate of tungsten oxide, or tungsten hexachloride powder, or ammonium tungstate powder, or a tungsten oxide hydrate powder obtained by dissolving tungsten hexachloride in alcohol and drying the mixture, or a tungsten oxide hydrate powder obtained by dissolving tungsten hexachloride in alcohol, making it precipitated by adding water and drying, or a tungsten compound powder obtained by drying an aqueous ammonium tungstate solution, or a metal tungsten powder, and a powder of a simple substance or a compound containing M element.

Further, when the tungsten compound as the starting material for obtaining the composite tungsten oxide fine particles is a solution or a dispersion liquid, each element can easily be uniformly mixed.

From this viewpoint, i further preferable that the starting material of the composite tungsten oxide fine particles is a powder obtained by mixing an alcohol solution of tungsten hexachloride, an ammonium tungstate solution, and a solution of a compound containing the M element, and then drying the mixture.

From a similar viewpoint, it is also preferable that the starting material of the composite tungsten oxide fine particles is a powder obtained by mixing a dispersion liquid prepared by dissolving tungsten hexachloride in alcohol and then adding water to form a precipitate, and powder of simple substance or compound containing M element or a solution of the compound containing the M element, and then drying the mixture.

Examples of the compound containing the M element, include a tungstate, a chloride salt, a nitrate, a sulfate, an oxalate, an oxide, a carbonate and a hydroxide of the M element. However, the compound is not limited thereto and a compound in a solution state may be acceptable. Further, when the composite tungsten oxide fine particles are produced industrially, hazardous gases and the like are not generated at the stage of the heat treatment or the like, by using tungsten oxide hydrate powder or tungsten trioxide and carbonate or hydroxide of M element, which is a preferable production method.

Here, explanation will be given for heat treatment conditions for the composite tungsten oxide fine particles in the reducing atmosphere or in the mixed gas atmosphere of the reducing gas and the inert gas.

First, the starting material is heat-treated in the reducing gas atmosphere or in the mixed gas atmosphere of the reducing gas and the inert gas. This heat treatment temperature is preferably higher than a temperature at which the composite tungsten oxide fine particles are crystallized. Specifically, 500° C. or more and 1000° C. or less is preferable, and 500° C. or more and 800° C. or less is more preferable. If desired, heat treatment may be performed at 500° C. to 1200° C. in the inert gas atmosphere.

Further, the reducing gas is not particularly limited, but is preferably $H_2$. Further, when H is used as the reducing gas, its concentration is not particularly limited as long as it is appropriately selected according to a firing temperature and an amount of the starting material. For example, the concentration is 20 vol % or less, preferably 10 vol % or less, more preferably 7 vol % or less. This is because when the concentration of the reducing gas is 20 vol % or less, it is possible to avoid the generation of $WO_2$ not having a solar radiation shielding function by rapid reduction.

By this heat treatment, $2.2 \leq z/y \leq 3.0$ is satisfied in the composite tungsten oxide.

Meanwhile, the method for producing the composite tungsten oxide is not limited to the solid phase reaction method. By setting an appropriate producing condition, the composite tungsten oxide can also be produced by a thermal plasma method. Examples of the producing conditions to be appropriately set, a supply rate at the time of supplying the raw material into thermal plasma; a flow rate of a carrier gas used for supplying the raw material; a flow rate of a plasma gas for holding a plasma region; and a flow rate of a sheath gas flowing just outside the plasma region etc.

As described above, the composite tungsten oxide fine particles having a-axis of 7.3850 Å or more and 7.4186 Å or less, and c-axis of 7.5600 mm or more and 7.6240 mm or less in the lattice constant, can be produced by setting production conditions.

It is preferable to coat the surface of the near-infrared shielding material fine particles obtained in the above-described step, with an oxide containing one or more kinds of metals selected from Si, Ti, Zr and Al, from a viewpoint of improving the weather resistance. The coating method is not particularly limited, but it is possible to coat the surface of the near-infrared shielding material fine particles by adding the metal alkoxide into a solution in which the near-infrared shielding material fine particles are dispersed.

A bulk body or the particles of the composite tungsten oxide may be made finer through the near-infrared shielding material fine particle dispersion liquid described later. In order to obtain the composite tungsten oxide fine particles from the near-infrared shielding material fine particle dispersion liquid, a solvent may be removed by a known method.

Further, as for forming the composite tungsten oxide bulk body and particles into finer particles, a dry process using a jet mill or the like is possible for obtaining the finer particles. However, as a matter of course, even in a case of the dry process for obtaining the finer particles, pulverization conditions (conditions for forming particles into finer particles) are set for the particles to have the particle size, the crystallite size, and a-axis length and c-axis length as the lattice constants of the obtained composite tungsten oxide. For example, if the jet mill is used, it is sufficient to select the jet mill which has an air flow rate and a treatment time as appropriate pulverization conditions.

[c] Volatile Component of the Composite Tungsten Oxide Fine Particles and a Drying Treatment Method Therefore As described above, the composite tungsten oxide fine particles of the present invention contain the volatile component in some cases, but the content of the volatile component is preferably 2.5 mass % or less. However, when the composite tungsten oxide fine particles are exposed to the atmosphere or the like and the content of the volatile component exceeds 2.5 mass %, the content of the volatile component can be reduced by the drying treatment.

Specifically, the composite tungsten oxide synthesized by the above-described method is pulverized and dispersed to obtain finer particles, and the composite tungsten oxide fine particles of the present invention can be produced through a step (pulverization and dispersion treatment step) of producing the composite tungsten oxide fine particle dispersion liquid and a step of drying the composite tungsten oxide fine particle dispersion liquid thus produced to remove the solvent (drying step).

Regarding the pulverizing and dispersing step, in order to describe in detail in the "[e] Method for producing the anti-counterfeit ink composition and producing the anti-counterfeit ink" described later, the drying treatment step will be described here.

The drying treatment step is a step of applying drying treatment to the composite tungsten oxide fine particle dispersion liquid obtained in a pulverizing and dispersing step described later to remove the volatile component in the dispersion liquid, to thereby obtain the composite tungsten oxide fine particles of the present invention.

As facilities for drying treatment, an air dryer, a universal mixer, a ribbon mixer, a vacuum flow drier, an oscillating fluid drier, a freeze dryer, a ribbon corn, a rotary kiln, a spray dryer, a pulverized dryer, and the like are preferable from a viewpoint that heating and/or decompression is possible and mixing and recovery of the fine particles is easy, but the present invention is not limited thereto.

As an example thereof, (1) A drying treatment by the air dryer, (2) A drying treatment by the vacuum flow drier, and (3) A drying treatment by a spray dryer will be described hereafter. Each drying treatment will be sequentially described hereinafter.

(1) Drying Treatment by an Air Dryer

This is a treatment method for applying drying treatment to the composite tungsten oxide fine particle dispersion liquid obtained by a method described later to remove the volatile component in the dispersion liquid by an air dryer. In this case, it is preferable to perform the drying treatment at a temperature higher than the temperature at which the volatile component volatilizes from the composite tungsten oxide fine particles and the temperature at which the element M is not desorbed, and 150° C. or less is preferable.

The composite tungsten oxide fine particles produced by the drying treatment using the air dryer are weak secondary aggregates. Even in this state, it is possible to disperse the composite tungsten oxide fine particles in a resin or the like, but in order to make it easier to disperse, it is also a preferable example to disintegrate the fine particles by a mash-crushing machine or the like.

(2) Drying Treatment by a Vacuum Flow Dryer

This is a treatment method for removing the volatile component in the composite tungsten oxide fine particle dispersion liquid by performing the drying treatment using the vacuum flow drier. In the vacuum flow drier, drying and disintegration treatments are performed at the same time under a reduced pressure atmosphere, and therefore in addition to having a high drying rate, aggregates as seen in the above-described dried product in the air dryer are not formed. Further, because of drying in the reduced pressure atmosphere, the volatile component can be removed even at a relatively low temperature, and an amount of a residual volatile component can be minimized as well.

The drying temperature is preferably set so as to be dried at a temperature at which the element M is not desorbed from the composite tungsten oxide fine particles, and it is a temperature higher than a temperature at which the volatile component is volatilized, and it is desirably 150° C. or less.

(3) Drying Treatment by a Spray Dryer

This is a treatment method for removing the volatile component of the composite tungsten oxide fine particle dispersion liquid by performing drying treatment using a spray dryer. In the spray dryer, secondary aggregation due to a surface force of the volatile component hardly occurs at the time of removing the volatile component in the drying treatment. Accordingly, the composite tungsten oxide fine particles that are not relatively secondary aggregated can be obtained in some cases even without disintegration treatment.

[d] Anti-Counterfeit k Composition and Anti-Counterfeit Ink

The anti-counterfeit ink composition and the anti-counterfeit ink of the present invention containing the above-described composite tungsten oxide fine particles have low absorption in the visible light region and absorption in the near-infrared region, and therefore absorbs a specific wavelength when a printing surface thereof is irradiated with an infrared laser. Accordingly, authenticity of the printed matter obtained by printing the anti-counterfeit ink composition or the anti-counterfeit ink on one side or both sides of the substrate to be printed, can be judged from a difference in a reflection amount or a transmission amount, by irradiation of the near-infrared rays of a specific wavelength and reading its reflection or transmission.

(1) Anti-counterfeit ink composition and (2) Anti-counterfeit ink of the present invention will be described hereafter.

(1) Anti-Counterfeit Ink Composition

The anti-counterfeit ink composition of the present invention contains the composite tungsten oxide fine particles of the present invention. As a result, it has a peak of transmittance in the visible light region, and therefore it is less colored and at the same time there is a bottom (absorption peak) of transmittance in the near infrared region. Therefore, by reading the information using an infrared sensor, from the printed matter on which the anti-counterfeit ink composition of the present invention is printed, it is possible to judge the authenticity of the printed matter by using the information.

Explanation will be given for (i) Composite tungsten oxide fine particles, (ii) Solvent, and (iii) Dispersion liquid, (iv) Liquid uncured resin cured with energy rays.

(i) Composite Tungsten Oxide Fine Particles

The transmission properties of the composite tungsten oxide fine particles are also changed depending on the particle size of the fine particle. Namely, the smaller the particle size of the fine particle is, the greater the difference in transmittance becomes between the peak of the transmittance in the visible light region and the bottom of the absorption in the near infrared region. On the contrary, when the particle size is large, the difference in transmittance becomes small, and the absorption of the near-infrared ray is decreased with respect to the peak of a visible light transmittance. Therefore, it is desirable that the particle size of the fine particle is appropriately set according to the intended use method or the like.

Further, when it is desired to maintain transparency of a transparent substrate used as a substrate to be printed, like a substantially transparent anti-counterfeit cord or a bar code, and when it is desired to maintain transparency enough to see through a background printing, it is preferable that the particle size of the composite tungsten oxide fine particle is small. Particularly, in a case of the anti-counterfeit printing which emphasizes transparency in the visible light region, it is necessary to consider light scattering due to the fine particles. This is because when the dispersed particle size of the fine particles is smaller than 200 nm, light in the visible light region having a wavelength of 400 to 780 nm is not scattered due to scattering by geometry or Mie scattering, and therefore the anti-counterfeit printed matter does not look like semi-foggy glass, and clear transparency can be obtained.

Further, when clear transparency is required for the anti-counterfeit printed matter, the dispersed particle size of the fine particle in the anti-counterfeit ink composition is preferably 200 nm or less, and more preferably 100 nm or less. When the dispersed particle size becomes 200 nm or less, light scattering is reduced to become a Rayleigh scattering region, and the scattered light is reduced in proportion to the particle size of the sixth power, and therefore transparency is improved as the particle size is decreased. Further, when the dispersed particle size becomes 100 nm or less, the scattered light is extremely reduced, which is more preferable. Further, even in the case of the near-infrared ray, scattering is reduced by decreasing the particle size, and absorption efficiency is increased, which is preferable.

Meanwhile, when the particle size is 1 nm or more, the above light resistance can be secured, and 10 nm or more is more preferable.

The dispersed particle size of each composite tungsten oxide fine particle in the anti-counterfeit ink composition and anti-counterfeit ink, and the average particle size of the composite tungsten oxide fine particles dispersed in the anti-counterfeit printed matter, are different in some cases. This is because even if the composite tungsten oxide fine particles are aggregated in the anti-counterfeit ink composition or the like, aggregation of the composite tungsten oxide fine particles is resolved when being processed into the anti-counterfeit printed matter.

Further, all of the composite tungsten oxide fine particles used as the near-infrared absorbing fine particles in the present invention are excellent in weather resistance because they are inorganic fine particles. In order to further improve the weather resistance, the surface of each fine particle can be coated with one or more or two or more compounds of Si, Ti, Al, and Zr. These compounds are basically transparent and do not reduce the visible light transmittance by coating.

(ii) Solvent

As a solvent to be used for the anti-counterfeit ink composition of the present invention, it is possible to use the solvent composed of one kind or more selected from water, alcohols such as ethanol, ketones such as methyl ethyl ketone, toluene, xylene, vegetable oils, compounds, derived from vegetable oils, and a petroleum solvent. As the vegetable, oils, drying oils such as linseed oil, sunflower oil, and tong oil, semidrying oils such as sesame oil, cottonseed oil, rapeseed oil, soybean oil, rice bran oil, and the like, non-drying oils such as olive oil, coconut oil, palm oil, dehydrated castor oil, can be used. As the vegetable oil-derived compound, fatty acid monoesters and ethers obtained by direct esterification reaction of fatty acid of vegetable oil and monoalcohol are used. It can be selected according to the purpose of use. As the petroleum type solvent, the solvent having a high aniline point so as not to erode a rubber part of the printing equipment is preferable, and Isopar E, Exxol Hexane, Exol Heptane, Exol E, Exol D30, Exol D40, Exol D60, Exol D80, Exol D95 Exol D110, Exol D130 (all of them are manufactured by Exon Mobil Corporation), and the like can be used as examples. Further, it is preferable that the content of the composite tungsten oxide fine particles contained in the composite tungsten oxide fine particle dispersion liquid is 0.01 mass % or more and 80 mass % or less.

(iii) Dispersant

The dispersant used in the anti-counterfeit ink composition according to the present invention further improves dispersion stability of the composite tungsten oxide fine particles in the composite tungsten oxide fine particle dispersion liquid, and avoids coarsening of dispersed particles due to re-aggregation. Therefore, addition of various dispersants surfactants, coupling agents and the like is also preferable. Although the dispersant, the coupling agent, and the surfactant can be selected according to the application, it is preferable to have an amine-containing group, a hydroxyl group, a carboxyl group, or an epoxy group as a functional group. These functional groups have an effect of adsorbing on the surface of the composite tungsten oxide fine particles to prevent aggregation and uniformly dispersing the composite tungsten oxide fine particles according to the present invention in the infrared absorbing film. A polymeric dispersant having any of these functional groups in the molecule is more desirable.

Preferred examples of commercially available dispersants include: SOLPERSE (registered trademark) (hereinafter the same) 3000, SOLPERSE 9000, SOLPERSE11200, SOLPERSE13000, SOLPERSE13240, SOLPERSE13650, SOLPERSE 13940, SOLSPERSE 16000, SOLSPERSE 17000, SOLSPERSE 18000, SOLSPERSE 20000, SOLSPERSE 21000, SOLSPERSE 24,000SC, SOLSPERSE 240000R, SOLSPERSE 26000, SOLSPERSE 27000, SOLSPERSE 28000, SOLSPERSE 31845, SOLSPERSE 32000, SOLSPERSE32500, SOLSPERSE32550, SOLSPERSE32600, SOLSPERSE33000, SOLPERSE33500, SOLPERSE34750, SOLPERSE35100, SOLSPERSE 35200, SOLSPERSE 36600, SOLSPERSE 37500, SOLSPERSE 38500, SOLPERSE39000, SOLPERSE41000, SOLPERSE41090, SOLPERSE53095, SOLPERSE55000, SOLPERSE56000, SOLPERSE76500, etc., manufactured by Nippon Lubrizol Corporation; and Disperbyk (registered trademark) (hereinafter the same)-101, Disperbyk-103, Disperbyk-107, Disperbyk-108, Disperbyk-109, Disperbyk-110, Disperbyk-111, Disperbyk- 112, Disperbyk-116, Disperbyk-130, Disperbyk-140, Disperbyk-142, Disperbyk-145, Disperbyk-154, Disperyk-161, Disperbyk-162, Disperbyk-163, Disperbyk-164, Disperbyk-165, Disperbyk-166, Disperbyk-167, Disperbyk-168, Disperbyk-170, Disperbyk-171, Disperbyk-174, Disperbyk-1.80, Disperbyk-181, Disperbyk-182, Disperbyk-183, Disperbyk-184, Disperbyk-185, Disperbyk-190, Disperbyk-2000, Disperbyk-2001, Disperbyk-2020, Disperbyk-2025, Disperbyk-2050, Disperbyk-2070, Disperbyk-2095, Disperbyk-2150, Disperbyk-21.55, Anti-Terra (registered trademark) (hereinafter the same)-U, Anti-Terra-203, Anti-Terra-204, BYK (registered trademark) (hereinafter the same)-P104, BYK-P104S, BYK-220S, BYK-6919, etc., manufactured by Big Chemie Japan; 4008, EFKA4046, EFKA4047, EFKA4015, EFKA4020, EFKA4050, EFKA4055, EFKA 4060, EFKA 4080, EFKA 4300, EFKA 4330, EFKA 4400, EFKA 4401, EFKA4402, EFKA4403, EFKA4500, EFKA4510, EFKA4530, EFKA4550, EFKA4560, EFKA4585, EFKA4800, EFKA5220, EFKA6230, JONCRYL (registered trademark) (hereinafter the same) 67, JONCRYL678, JONCRYL586, JONCRYL611, JONCRY680, JONCRYL682, JONCRYL690, JONCRYL819, JONCRYL-JDX5050, etc manufactured by BASF Japan;

TERPLUS (registered trademark) MD1000, D 1180, D 1130, etc., manufactured by Otsuka Chemical Co., Ltd; and Ajisper (registered trademark) (hereinafter the same) P13-711, Azisper PB-821, Azisper PB-822, etc., manufactured by Ajinomoto Fine Techno Co., Ltd.

(iv) Liquid Uncured Material of Resin Curable by Energy Rays

For the anti-counterfeit ink composition of the present invention, a liquid uncured material of resin curable by energy rays can be used in place of the above-described solvent. Of course, the liquid uncured material of resin curable by energy rays and the above-described solvent may be used in combination.

Here, the liquid uncured material of resin curable, by energy rays used in the anti-counterfeit ink composition of the present invention includes, a liquid uncured material of resin curable by UV-rays a liquid uncured material of resin curable by electron beams, and a liquid uncured material of resin curable by heat. Such liquid uncured materials of resins curable by these energy rays can disperse composite tungsten oxide fine particles in the same manner as the solvent used for the anti-counterfeit ink composition of the present invention. Further, even in the anti-counterfeit ink composition using the liquid uncured material of resin curable by these energy rays, the content of the composite tungsten oxide fine particles is preferably 0.01 mass % or more and 80 mass % or less.

Then, in the anti-counterfeit composition of the present invention, a solvent-free anti-counterfeit ink can be obtained when the liquid uncured material of resin curable by energy rays is used without using the above solvent.

Here, the liquid uncured material of resin curable by energy rays includes: monomers and oligomers such as acrylic resins having multiple bonds polymerized by radical addition as monomers and oligomers, and monomers and oligomers such as epoxy resin, phenol resin, or urethane resin having functional groups that are crosslinked two- or three-dimensionally by energy rays. For example, the liquid uncured material of the ultraviolet curable resin includes a polymerization initiator and a liquid monomer or oligomer which is polymerized by radicals generated from the polymerization initiator.

Note that when the anti-counterfeit ink composition of the present invention contains the liquid uncured material of a resin curable by energy rays, it is preferable not to contain the radical polymerization initiator from a viewpoint of storage stability, (2) Anti-Counterfeit Ink The anti-counterfeit ink of the present invention is obtained by adding a desired organic binder and appropriately added one or more kinds selected from the polymerization initiators, pigments and dyes, and further desired each kind of additive. The anti-counterfeit printed matter can be formed by printing the anti-counterfeit ink of the present invention on a desired substrate to be printed.

When the anti-counterfeit ink is produced from the solvent-containing anti-counterfeit ink composition out of the above-described anti-counterfeit ink compositions, the organic binder may be further added. The organic binder is not particularly limited and may be any one of the resins such as acrylic, urethane, epoxy, fluorine, vinyl, and rosin, etc., and it is possible to select the one suitable for the application.

Further, when the anti-counterfeit ink is produced from the an counterfeit ink composition containing the liquid uncured material of resin curable by energy rays out of the above-described anti-counterfeit ink compositions, it is preferable to add the polymerization initiator which reacts with the energy rays. In the anti-counterfeit ink containing the liquid uncured material of resin curable by energy rays, the liquid uncured material is cured to form the organic binder for the anti-counterfeit printed matter under irradiation of the energy rays.

Further the anti-counterfeit ink composition containing the liquid uncured material of resin curable by energy rays out of the anti-counterfeit ink compositions, can also be the anti-counterfeit ink as well as being the anti-counterfeit ink composition, on the basis of its constitution.

For example, the color pigment that transmits the near-infrared rays can be contained. By containing such a color pigment, it is possible to obtain the colored anti-counterfeit ink that exhibits the same color as the color pigment in the visible light region which is felt by human eyes, but has characteristic absorption in the near-infrared region. Note that this colored anti-counterfeit ink absorbs little in the visible light region, and therefore a color tone of the color pigment is retained. Further, a fluorescent material or a pearl pigment may be added.

Further for example, the anti-counterfeit ink obtained by mixing a black pigment as the color pigment which transmits the near-infrared rays, is recognized as equivalent black color in human eyes, compared with the black ink containing only black pigment, but it can be understood that when compared by irradiation of infrared rays, such a black anti-counterfeit ink has a different transmission profile. Accordingly, a printed matter using this black anti-counterfeit ink, for example, a printed matter printed with a barcode printed thereon, enables further complicated and advanced an counterfeit function by printing ordinary black ink that does not contain a near-infrared absorbing material, as a dummy.

Further, coating or printing of the black ink using the black pigment and other near-infrared ray transmitting color pigment is performed on a printed layer of the printed matter obtained by printing the anti-counterfeit ink of the present invention on one side or both sides of a substrate to be printed, to thereby make the anti-counterfeit printed matter. This anti-counterfeit printed matter is colored black or otherwise recognized by human eyes, but letters, symbols etc., readable only by infrared rays are hidden and printed in the same area, and therefore it is possible to judge the authenticity of printed matter by irradiation of the infrared rays.

As such a color pigment, the black pigment which transmits the near-infrared rays is preferable. Further, preferable specific examples of the black pigment include, complex oxides such as Cu—Fe—Mn, Cu—Cr, Cu—Cr—Mn, Cu—Cr—Mn Ni, Cu—Fe, and Co—Cr—Fe, etc., or titanium black, titanium nitride, titanium oxynitride, dark azo pigment, perylene black pigment, aniline black pigment, and carbon black. The dispersed particle size of the black pigment in the anti-counterfeit ink is preferably 200 nm or less, more preferably 100 nm or less like the near infrared ray-absorbing fine particles. The reason therefore is the same as in the case of the above-described composite tungsten oxide fine particles.

Further, by decreasing the dispersed particle size of the black pigment, the color tone appears deep and is likely to be favored as a design. Further, when fine printing is required, light scattering is reduced by decreasing the dispersed particle size of the color pigment, which is preferable because an outline of a printed pattern becomes clear.

In the composite tungsten oxide fine particles contained in the anti-counterfeit ink composition and the anti-counterfeit ink, the volatile component of 2.5 mass % is sometimes contained, by passing through the composite tungsten oxide fine particle dispersion liquid or by being in a storage state of the composite tungsten oxide fine particles in the process of producing the anti-counterfeit ink composition and the anti-counterfeit ink.

Further, in the anti-counterfeit ink of the present invention, it is possible to make a general blend of the anti-counterfeit ink of the present invention in accordance with a printing method, such as gravure ink, screen ink, offset ink, melt thermal transfer ink, intaglio ink, ink jet ink, and flexo ink, and a plasticizer for plastic, an oxidant inhibitor, a thickener, a wax, and the like can be contained.

[e] Method for Producing the Anti-Counterfeit Ink Composition and Producing the Anti-Counterfeit The anti-counterfeit ink of the present invention is produced by dispersing the composite tungsten oxide fine particles and optionally the color pigment in the solvent. As described above, as the solvent, it is possible to use the solvent composed of one kind or more selected from water, alcohols such as ethanol, ketones such as methyl ethyl ketone, toluene, xylene, vegetable oils, compounds derived from vegetable oils, and a petroleum solvent. As the vegetable oils, drying oils such as linseed oil, sunflower oil, tung oil and coo oil, semidrying oils such as sesame oil, cottonseed oil, rapeseed oil, soybean oil, rice bran oil, poppy seed oil and the like, non-drying oils such as olive oil, coconut oil, palm oil, dehydrated castor oil, can be preferably used. As the vegetable oil-derived compound, fatty acid monoesters obtained by direct esterification reaction of fatty acid of vegetable oil and monoalcohol, and ethers are preferably used. As petroleum-based solvents, Isopar E, Exol Hexane, Exol Heptane, Exol E, Exol D30, Exol D40, Exol D60, Exol D80, Exol D95, Exol D110, Exol D130 (all of them are manufactured by Exon Mobil Corporation), and the like having a high aniline point can be used. These solvents can be selected according to an intended use of the anti-counterfeit ink composition and the anti-counterfeit ink. Among them, the vegetable oils and the compounds derived from vegetable oils are preferable. This is because the vegetable oils and the compounds derived from vegetable oils do not erode rubber parts of printing equipment. Further, when the petroleum solvent is used instead of the vegetable oils or the compounds derived from the vegetable oils, the petroleum solvent having a high aniline point is preferable so as not to erode the rubber parts of the printing equipment. A method for dispersing the fine composite tungsten oxide particles and the color pigment as needed into the solvent is not particularly limited, and use of the ultrasonic waves, the medium stirring mill, or the like is preferable because particles can be loosened and become finer.

The method for dispersing the composite tungsten oxide fine particles in the liquid uncured material of resin curable by a solvent or energy rays to obtain the anti-counterfeit ink composition is not particularly limited as long as the fine particles can be uniformly dispersed in the solvent without aggregation. Examples of the dispersion method include a pulverization and dispersion treatment method using a device such as a bead mill, a ball mill, a sand mill, a paint shaker, an ultrasonic homogenizer, or the like. Among them, it is more preferable to use media stirring mills such as a bead mill, a ball mill, a sand mill, or a paint shaker in which media (beads, balls, ottawa sand) is used, because pulverization and dispersion to a desired particle size is possible for a short time by such media stirring mills. Through pulverization and dispersion treatment using these media stirring mills, formation of the fine particles is accelerated due to collision of the composite tungsten oxide fine particles and collision of media against the fine particles simultaneously with the dispersion of the composite tungsten oxide fine particles in the dispersion liquid, and the composite tungsten oxide fine particles can be more finely pulverized and dispersed (namely, they are pulverized and dispersed).

In the pulverization dispersing treatment step, conditions for pulverization/dispersion treatment are set so as to ensure the lattice constant of the composite tungsten oxide fine particles to be in the range of 7.3850 mm or more and 7.4186 mm or less for the a-axis, and 7.5600 mm or more and 7.6240 mm or less for the c-axis. With this setting, the anti-counterfeit ink and the anti-counterfeit printed matter exhibit excellent optical properties.

[f] Anti-Counterfeit Printed Matter

The anti-counterfeit printed matter can be obtained by coating or printing the surface of the substrate to be printed with the anti-counterfeit k of the present invention by a normal method. In this case, the an counterfeit printed matter is formed by removing the solvent by evaporation or the like to fix it to the surface of the substrate to be printed, or by irradiating the energy rays to cure the liquid uncured material of resin curable by energy rays, to fix it to the surface of the substrate to be printed.

Further, when the anti-counterfeit ink composition of the present invention does not contain the binder, a printed layer is obtained by coating or printing the substrate to be printed and evaporating the solvent. However, in this case, it is preferable to provide a cover layer rude of a transparent resin on the printed layer in order to prevent peeling off of the printed layer and falling off of the fine particles.

The content of the composite tungsten oxide fine particles in the anti-counterfeit printed matter can be changed depending on the intended use, but it is usually preferably 0.05 g/m$^2$ or more. When the content is 0.05 g/m$^2$ or more, the absorption in the near infrared region becomes conspicuous and a function as the anti-counterfeit ink is exhibited. Further, an upper limit of the content is not particularly limited, but when it is 4 g/m$^2$ or less, light in the visible light region is not greatly absorbed, which is preferable from a viewpoint of maintaining transparency. Note that the content of the composite tungsten oxide fine particles can be evaluated by the content per 1 m² of the printed layer, because all fillers act equally on the light beams incident on the printing surface.

As the substrate to be printed with the anti-counterfeit ink composition or the anti-counterfeit ink, the substrate suited for the intended use may be used, and a mixture of resin and pulp, a resin film, or the like can be used in addition to paper. Further, it is also acceptable that a surface of a seal is printed with the anti-counterfeit ink of the present invention, and this seal may be attached to the substrate to be printed.

The anti-counterfeit printed matter of the present invention thus produced, cannot be duplicated by copying, etc., whose authenticity can be judged mechanically and reliably by irradiating infrared rays and detecting reflection or transmission thereof, regardless of visual judgment. In addition, inorganic fine particles called composite tungsten oxide are used as infrared absorbing fine particles and such fine particles are applied to the substrate to be printed by a printing method. Therefore, the anti-counterfeit printed matter which is excellent in weather resistance and light resistance can be provided at a low cost.

[g] Near-Infrared Absorption Effect of the Anti-Counterfeit Printed Matter

The anti-counterfeit printed matter using the anti-counterfeit ink according to the present invention, exhibits excellent property as follows: the local maximum value (%)–the local minimum value (%)≥69 (points), that is, the difference between the local maximum value and the local minimum value is 69 points or more in percentage, when having the local maximum value in the wavelength range from 350 nm to 600 nm and having the local minimum value in the wavelength range from 800 nm to 2100 nm.

The difference between the local maximum value and the local minimum value of the transmittance in the anti-counterfeit printed matter with transparent base material is as large as 69 points or more, indicating that the dispersion body is excellent in the near infrared absorption effect.

EXAMPLES

The present invention will be specifically described hereafter, with reference to examples. However, the present invention is not limited to the examples described below.

Note that the optical properties of the printed layer in the examples and comparative examples were measured using a spectrophotometer (U-4100, manufactured by Hitachi, Ltd.), and the visible light transmittance was measured according to HS R 3106. Further, the dispersed particle size was shown by an average value measured by a particle size measuring device (ELS-8000 manufactured by Otsuka. Electronics Co., Ltd.) based on a dynamic light scattering method as a principle. The average particle size of each composite tungsten oxide ultrafine particle dispersed in the printed layer was measured by observing a transmission electron microscope image of the cross-section of the printed layer. The transmission electron microscope image was observed using a transmission electron microscope (HF-2200, manufactured by Hitachi High-Technologies Corporation). The transmission electron microscopic image was processed using an image processing device to measure the particle size of 100 composite tungsten oxide fine particles, and the average value thereof was taken as the average particle size.

Further, for the measurement of the crystal structure, the lattice constant and the crystallite size of the composite tungsten oxide fine particles of the present invention, the composite tungsten oxide fine particles obtained by removing the solvent from the dispersion liquid for forming the near-infrared shielding body was used. Then, an X-ray diffraction pattern of the composite tungsten oxide fine particles was measured by a powder X-ray diffraction method (θ-2θ method) using a powder X-ray diffractometer (X'Pert-PRO/MPD manufactured by Spectris Corporation PANalytical). From the obtained X-ray diffraction the crystal structure contained in the fine particle was specified, and further, the lattice constant and the crystallite size were calculated using the Rietveld method.

Example 1

7.43 kg of cesium carbonate ($Cs_2CO_3$) was dissolved in 6.70 kg of water to obtain a solution. The solution was added to 34.57 kg of tungstic acid ($H_2WO_4$) and sufficiently stirred and mixed, and thereafter dried while stirring (the molar ratio between W and Cs is equivalent to 1:0.33). The dried product was heated while supplying 5 vol % of $H_2$ gas using $N_2$ gas as a carrier, and fired at a temperature of 800° C. for 5.5 hours, and thereafter, the supply gas was switched to $N_2$, gas only, and the temperature was lowered to room temperature to obtain Cs tungsten oxide particles (referred to as particle a hereafter).

10 parts by mass of particles a, 10 parts by mass of an acrylic polymer dispersant having a group containing amine as a functional group (an acrylic dispersant having an amine value of 48 mg KOH/g and a decomposition temperature of 250° C.) (referred to as dispersant a hereafter), and 80 by mass of methyl is butyl ketone as an organic solvent were weighed. These raw materials were charged in a paint shaker (manufactured by Asada Iron Works Co., Ltd.) containing 0.3 mmφ $ZrO_2$ beads, followed by pulverization/dispersion treatment for 7 hours to obtain a particle dispersion liquid of particles a (referred to as particle dispersion liquid a hereafter).

Production conditions are shown in table 1.

Here, when the dispersed particle size of the particles a in the particle dispersion liquid a was measured with a particle size measuring device (ELS-8000 manufactured by Otsuka Electronics Co., Ltd.) based on a dynamic light scattering method, it was 70 nm. Further, as a result of measuring the X-ray diffraction pattern of the particles a after removing the solvent from the particle dispersion liquid a and identifying a phase, the resulting fine particles were identified as hexagonal $Cs_{0.33}WO_3$ single phase. Further, when the lattice constant of the fine particles a was measured, the a-axis was 7.4065 Å and the c-axis was 7.6181 Å. The crystallite size was 24 nm.

Further, 100 g of the particle dispersion liquid a was mixed with 20 g of ultraviolet curing resin UV 3701 (produced by Toagosei Co., Ltd.) to thereby obtain the anti-counterfeit ink (referred to as an anti-counterfeit ink A hereafter) of example 1.

As a substrate to be printed, a transparent PET film having a thickness of 50 μm was used, and a layer was formed thereon with the anti-counterfeit ink using a bar coater. The layer was dried at 70° C. for 1 minute to evaporate the solvent, then irradiated with ultraviolet rays using a high pressure mercury lamp so that the ultraviolet curing resin is cured, to thereby obtain a printed layer of the anti-counterfeit ink according to example 1 (referred to as a printed layer A hereafter).

When an average particle size of the Cs tungsten oxide fine particles dispersed in the printed layer A was calculated by an image processing apparatus using a transmission electron microscope image, it was 25 nm.

For the printed layer A, the visible light transmittance was obtained by the above-described method. Further, the difference between the local maximum value of the transmittance in the wavelength range from 350 nm to 600 nm and the local minimum value of the transmittance in the wavelength range from 800 nm to 2100 nm was obtained as a point, and the transmittance at wavelengths of 500 nm, 1000 nm, and 1500 nm was measured.

The visible light transmittance was 70.2%, the difference between the local maximum value and the local minimum value of the transmittance was 71.8 points, the transmittance at a wavelength of 500 nm was 72.1%, the transmittance at 1000 nm was 4.8%, and the transmittance at 1500 nm was 2.2%.

The results are shown in table 3.

Example 2

Cs tungsten oxide fine particles (referred to as particles b hereafter) according to example 2 were obtained in the same manner as in example 1 except that predetermined amounts of tungstic acid and cesium carbonate were weighed so that the molar ratio of W and Cs was 1:0.31.

Further, a dispersion liquid of particles b (referred to as a particle dispersion liquid b hereafter) was obtained in the same manner as in example 1 except that the particles b were used in place of the particles a.

An anti-counterfeit ink according to example 2 (referred to as an anti-counterfeit ink B hereafter) was obtained in the same manner as in example 1 except that the particle dispersion liquid b was used in place of the particle dispersion liquid a.

Subsequently, a printed layer of the anti-counterfeit ink according to example 2 (referred to as a printed layer B hereafter) was obtained in the same manner as example 1 except that the anti-counterfeit ink A was used in place of the anti-counterfeit ink A.

Evaluation was performed in the same manner as in example 1 except that the particle dispersion liquid b was used in place of the particle dispersion liquid a and the printed layer B was used in place of the printed layer A. Production conditions and evaluation results are shown in tables 1 and 3.

Example 3

Cs tungsten oxide fine particles (referred to as "Cs tungsten oxide fine particles" hereafter) according to example 3 were obtained in the same manner as in example 1 except that predetermined amounts of tungstic acid and cesium carbonate were weighed so that the molar ratio of W and Cs was 1:0.35.

Further, a dispersion liquid of particles c (referred to as a particle dispersion liquid c hereafter) was obtained in the same manner as in example 1 except that the particles c were used in place of the particles a.

An anti-counterfeit ink according to example 3 (referred to as an anti-counterfeit ink C hereafter) was obtained in the same manner as in example 1 except that the particle dispersion liquid c was used in place of the particle dispersion liquid a.

Subsequently, a printed layer of the anti-counterfeit ink according to example 3 (referred to as a printed layer C hereafter) was obtained in the same manner as in example 1 except that the anti-counterfeit ink C was used in place of the anti-counterfeit ink A.

Evaluation was performed in the same manner as in example 1 except that the particle dispersion liquid c was used in place of the particle dispersion liquid a and the printed layer C was used in place of the printed layer A. The production conditions and the evaluation results are shown in tables 1 and 3.

Example 4

Cs tungsten oxide fine particles according to example 4 (referred to as particles d hereafter) were obtained in the same manner as in example 1 except that predetermined amounts of tungstic acid and cesium carbonate were weighed so that the molar ratio of W to Cs was 1:0.37.

Further, a dispersion liquid of particles d (referred to as a particle dispersion liquid d hereafter) was obtained in the same manner as in example 1 except that the particles d were used in place of the particles a.

An anti-counterfeit ink according to example 4 (referred to as an anti-counterfeit ink D hereafter) was obtained in the same manner as in example 1 except that the particle dispersion liquid d was used in place of the particle dispersion liquid a.

Subsequently, a printed layer of the anti-counterfeit ink according to example 4 (referred to as a printed layer D hereafter) was obtained in the same manner as in example 1 except that the anti-counterfeit ink D was used in place of the anti-counterfeit ink A.

Evaluation was performed in the same manner as in example 1 except that the particle dispersion liquid d was used in place of the particle dispersion liquid a and the printed layer D was used in place of the printed layer A. The production conditions and the evaluation results are shown in tables 1 and 3.

Example 5

Cs tungsten oxide fine particles (referred to as particles e hereafter) according to example 5 were obtained in the same manner as in example except that predetermined amounts of tungstic acid and cesium carbonate were weighed so that the molar ratio of W and Cs was 1:0.21.

Further, a dispersion liquid of particles e (referred to as a particle dispersion liquid e hereafter) was obtained in the same manner as in example 1 except that the particles e were used in place of the particles a.

An anti-counterfeit ink according to example 5 (referred to as an anti-counterfeit ink E hereafter) was obtained in the same manner as in example except that the particle dispersion liquid e was used in place of the particle dispersion liquid a.

Subsequently, a printed layer of the anti-counterfeit ink according to example 5 (referred to as a printed layer E hereafter) was obtained in the same manner as in example 1 except that the anti-counterfeit ink E was used in place of the anti-counterfeit ink A.

Evaluation was performed in the same manner as in example 1 except that the particle dispersion liquid e was used in place of the particle dispersion liquid a, and the printed layer E was used in place of the printed layer A. The production conditions and the evaluation results are shown in tables 1 and 3.

Example 6

Cs tungsten oxide fine particles (referred to as particles f hereafter) according to example 6 were obtained in the same manner as in example 1 except that firing was performed at 550° C. for 9.0 hours while supplying 5% $H_2$ gas using $N_2$ gas as a carrier.

Further, a dispersion liquid of particles f (referred to as a particle dispersion liquid f hereafter) was obtained in the same manner as in example 1 except that the particles f were used in place of the particles a.

An anti-counterfeit ink according to Example 6 (hereinafter referred to as anti-counterfeit ink F) was obtained in the same manner as in example 1 except that the particle dispersion liquid f was used in place of the particle dispersion liquid a.

Subsequently, a printed layer of the anti-counterfeit ink according to example 6 (referred to as a printed layer F hereafter) was obtained in the same manner as in example 1 except that the anti-counterfeit ink F was used in place of the anti-counterfeit ink A.

Evaluation was performed in the same manner as in example 1 except that the particle dispersion liquid f was used in place of the particle dispersion liquid a and the printed layer F was used in place of the printed layer A. The production conditions and the evaluation results are shown in tables 1 and 3.

Example 7

Rb tungsten oxide fine particles (referred to as particles g hereafter) according to example 7 were obtained in the same manner as in example 1 except that cesium carbonate was changed to rubidium carbonate.

Further, a dispersion liquid of particles g (referred to as a particle dispersion liquid g hereafter) was obtained in the same manner as in example 1 except that the particles g were used in place of the particles a.

An anti-counterfeit ink according to example 7 (referred to as an anti-counterfeit ink G hereafter) was obtained in the same manner as in example 1, except that the particle dispersion liquid g was used in place of the particle dispersion liquid a.

Subsequently, a printed layer of the anti-counterfeit ink according to example 7 (referred to as a printed layer G hereafter) was obtained in the same manner as in example 1 except that the anti-counterfeit ink G was used in place of the anti-counterfeit ink A.

Evaluation was performed in the same manner as in example 1 except that the particle dispersion liquid g was used in place of the particle dispersion liquid a, and the printed layer G was used in place of the printed layer A. The production conditions and the evaluation results are shown in tables 1 and 3.

Example 8

Cs/Rb tungsten oxide fine particles (wherein, Cs/W=0.03, Rb/W=0.30, referred to as particles h hereafter) according to example 8 were obtained in the same manner as in example 1 except that the cesium carbonate was changed to a mixture of cesium carbonate and rubidium carbonate.

Further, a dispersion liquid of particles h (referred to as a particle dispersion liquid h hereafter) was obtained in the same manner as in example 1 except that the particles h were used in place of the particles a.

An anti-counterfeit ink according to example 8 (referred to as an anti-counterfeit ink H hereafter) was obtained in the same manner as in example except that the particle dispersion liquid h was used in place of the particle dispersion liquid a.

Subsequently, a printed layer of the anti-counterfeit ink according to example 8 (referred to as a printed layer H hereafter) was obtained in the same manner as in example 1 except that the anti-counterfeit ink H was used in place of the anti-counterfeit ink A.

Evaluation was performed in the same manner as in example 1 except that the particle dispersion liquid h was used in place of the particle dispersion liquid a and the printed layer H was used in place of the printed layer A. The production conditions and the evaluation results are shown in tables 1 and 3.

Example 9

Cs/Rb tungsten oxide fine particles (wherein, Cs/W=0.20, Rb/W=0.13, referred to as particles I hereafter) according to example 9 were obtained in the same as in example 1 except that the cesium carbonate was changed to a mixture of cesium carbonate and rubidium carbonate.

Further, a dispersion liquid of particles i (referred to as a particle dispersion liquid i hereafter) was obtained in the same manner as in example 1 except that the particles i were used in place of the particles a.

An anti-counterfeit ink (referred to as an anti-counterfeit ink I hereafter) according to example was obtained in the same manner as in example 1 except that the particle dispersion liquid i was used in place of the particle dispersion liquid a.

Subsequently, a printed layer of the anti-counterfeit ink according to example 9 (referred to as a printed layer I hereafter) was obtained in the same manner as in example 1 except that the anti-counterfeit ink I was used in place of the anti-counterfeit ink A.

Evaluation was performed in the same manner as in example 1 except that the particle dispersion liquid i was used in place of the particle dispersion liquid a, and the printed layer I was used in place of the printed layer A. The production conditions and the evaluation results are shown in tables 1 and 3.

Example 10

Cs/Rb tungsten oxide fine particles (however Cs/W=0.25 Rb/W=0.08, hereinafter referred to as particle j) according to Example 10 were obtained in the same as in example 1 except that the cesium carbonate was changed to a mixture of cesium carbonate and rubidium carbonate.

Further, a dispersion liquid of particles j (referred to as particles dispersion j hereafter) was obtained in the same manner as in example 1 except that the particles j were used in place of the particles a.

An ti-counterfeit ink according to example 10 (referred to as an anti-counterfeit ink J hereafter) was obtained in the same manner as in example 1 except that the particle dispersion liquid j was used instead of the particle dispersion liquid a.

Subsequently, a printed layer of the anti-counterfeit ink according to example 10 (referred to as a printed layer J hereafter) was obtained in the same manner as in example 1 except that the anti-counterfeit ink J was used in place of the anti-counterfeit ink A.

Evaluation was performed in the same manner as in ample I except that the particle dispersion liquid j was used in place of the particle dispersion liquid a, and the printed layer J was used in place of the printed layer A. The production conditions and the evaluation results are shown in tables 1 and 3.

Example 11

Cs/Rb tungsten oxide fine particles (wherein Cs/W=0.30, Rb/W=0.03, referred to as particles k hereafter) according to example 11 were obtained in the same as in example 1 except that the cesium carbonate was changed to a mixture of cesium carbonate and rubidium carbonate.

Further, a dispersion liquid of particles k (referred to as a particle dispersion liquid k hereafter) was obtained in the same manner as in example 1 except that the particles k were used in place of the particles a.

An anti-counterfeit ink according to example 11 (referred to as an anti-counterfeit ink K hereafter) was obtained in the same manner as in example 1 except that the particle dispersion liquid k was used in place of the particle dispersion liquid a.

Subsequently, a printed layer of the anti-counterfeit ink according to example 11 (referred to as a printed layer K hereafter) was obtained in the same manner as in example 1 except that the anti-counterfeit ink K was used in place of the anti-counterfeit ink A.

Evaluation was performed in the same manner as in example 1 except that the particle dispersion liquid k was used in place of the particle dispersion liquid a, and the printed layer K was used in place of the printed layer A. The production conditions and the evaluation results are shown in tables 1 and 3.

Comparative Example 1

Cs tungsten oxide fine particles (referred to as particles 1 hereafter) according to comparative example 1 were obtained in the same as in example 1 except that predetermined amounts of tungstic acid and cesium carbonate was weighed so that the molar ratio of W and Cs was 1:0.15.

Further, a dispersion liquid of particles 1 (referred to as a particle dispersion liquid 1 hereafter) was obtained in the same manner as in example 1 except that the particles 1 were used in place of the particles a.

An anti-counterfeit ink according to comparative example 1 (referred to as an anti-counterfeit ink L hereafter) was obtained in the same manner as in example 1 except that the particle dispersion liquid 1 was used in place of the particle dispersion liquid a.

Subsequently, a printed layer of the anti-counterfeit ink according to comparative example 1 (referred to as a printed layer L hereafter) was obtained in the same manner as in example 1 except that the anti-counterfeit ink L was used in place of the anti-counterfeit ink A.

Evaluation was performed in the same manner as ire example 1 except that the particle dispersion liquid 1 was used in place of the particle dispersion liquid a, and the printed layer L was used in place of the printed layer A. The production conditions and the evaluation results are shown in tables 2 and 4.

Comparative Example 2

Cs tungsten oxide fine particles (referred to as particles m hereafter) according to comparative example 2 were obtained in the same manner as in example 1 except that predetermined amounts of tungstic acid and cesium carbonate were weighted so that the molar ratio of W and Cs was 1:0.39.

Further, a dispersion liquid of particles in (referred to as a particle dispersion liquid m hereafter) was obtained in the same manner as in example 1 except that the particles m were used in place of the particles a.

An anti-counterfeit k according to comparative example 2 (referred to as an anti-counterfeit ink M hereafter) was obtained in the same manner as in example 1 except that the particle dispersion liquid m was used in place of the particle dispersion liquid a.

Subsequently, a printed layer of the anti-counterfeit ink according to comparative example 2 (referred to as a printed layer M hereafter) was obtained in the same manner as in example 1 except that the anti-counterfeit ink M was used in place of the anti-counterfeit ink A.

Evaluation was performed in the same manner as in example 1 except that the particle dispersion liquid m was used in place of the particle dispersion liquid a, and the printed layer M was used in place of the printed layer A. The production conditions and the evaluation results are shown in tables 2 and 4.

Comparative Example 3

Cs tungsten oxide fine particles (referred to as particles n hereafter) according to comparative example 3 were obtained in the same manner as in example 1 except that predetermined amounts of tungstic acid and cesium carbonate were weighed so that the molar ratio of W and Cs was 1:0.23, and fired at a temperature of 400° C. for 5.5 hours in example 1.

An anti-counterfeit ink according to comparative example 3 (referred to as an anti-counterfeit ink N hereafter) was obtained in the same manner as in example 1 except that the particle dispersion liquid n was used in place of the particle dispersion liquid a.

Subsequently, a printed layer of the anti-counterfeit ink according to comparative example 3 (referred to as a printed layer N hereafter) was obtained in the same manner as in example 1 except that the anti-counterfeit ink N was used in place of the anti-counterfeit ink A.

Evaluation was performed in the same manner as in example 1 except that the particle dispersion liquid n was used in place of the particle dispersion liquid a, and the printed layer N was used in place of the printed layer A. The production conditions and the evaluation results are shown in tables 2 and 4.

Comparative Example 4

10 parts by mass of particles a, 10 parts by mass of dispersant a, and 80 parts by mass pf methyl isobutyl ketone were weighed and mixed by ultrasonic vibration for 10 minutes, to thereby obtain a dispersion liquid of the particles a (referred to as a particle dispersion liquid o hereafter).

An anti-counterfeit ink according to comparative example 4 (referred to as an anti-counterfeit ink O hereafter) was obtained in the same manner as in example 1 except that the particle dispersion liquid o was used in place of the particle dispersion liquid a.

Subsequently, a printed layer of the anti-counterfeit ink according to comparative example 4 (referred to as a printed layer O hereafter) was obtained in the same manner as in example 1 except that the anti-counterfeit ink O was used in place of the anti-counterfeit ink A.

Evaluation was performed in the same manner as in example 1 except that the particle dispersion liquid o was used in place of the particle dispersion liquid a, and the printed layer O was used in place of the printed layer A. The production conditions and the evaluation results are shown in tables 2 and 4.

Comparative Example 5

A particle dispersion liquid p and an anti-counterfeit ink P according to comparative example 5 were obtained in the same manner as in example 1 except that pulverization/dispersion treatment was performed for 50 hours using a paint shaker in example 1.

Subsequently, a printed layer of the anti-counterfeit ink according to comparative example 5 (referred to as a printed layer P hereafter) was obtained in the same manner as in example 1 except that the anti-counterfeit ink P was used in place of the anti-counterfeit ink A.

Evaluation was performed in the same manner as in example 1 except that the particle dispersion liquid p was used in place of the particle dispersion liquid a, and the printed layer P was used in place of the printed layer A. The production conditions and the evaluation results are shown in tables 2 and 4.

Conclusion

According to the results of the examples and the comparative examples shown above, the printed layers containing the composite tungsten oxide fine particles according to examples 1 to 11 efficiently absorbed light in the near-infrared region, and at the same time, maintained high transmittance in the visible light region.

In contrast, in the printed layers containing the composite tungsten oxide fine particles according to comparative examples 1 to 5, the difference between the local maximum value and the local minimum value of the light transmittance was less than 69 points.

As described above, it is found that an excellent anti-counterfeit ink printed matter can be obtained using the anti-counterfeit ink produced using the composite tungsten oxide fine particles according to the above examples.

TABLE 1

| | Raw material | | | Firing | | | Dispersion condition | | | | | | |
| --- | --- | --- | --- | --- | --- | --- | --- | --- | --- | --- | --- | --- | --- |
| | | Cs/W | Rb/W | Furnace gas | Temperature | Time | Particle | Dispersant | | Organic solvent | Beads | | b |
| | Kind | Ratio | Ratio | Kind, Concentration | [° C.] | [h] | a | Kind | a | a | φ [mm] | Stirrer | [h] |
| Example 1 | $Cs_2CO_3$ & $H_2WO_4$ | 0.33 | — | $N_2$ carrier, 5% $H_2$ $N_2$ atmosphere | 800 c | 5.5 — | 10 | Acrylic polymer dispersant | 10 | 80 | 0.3 | Paint shaker | 7 |
| Example 2 | | 0.31 | — | $N_2$ carrier, 5% $H_2$ $N_2$ atmosphere | 800 c | 5.5 — | 10 | | 10 | 80 | 0.3 | | 7 |
| Example 3 | | 0.35 | — | $N_2$ carrier, 5% $H_2$ $N_2$ atmosphere | 800 c | 5.5 — | 10 | | 10 | 80 | 0.3 | | 7 |
| Example 4 | | 0.37 | — | $N_2$ carrier, 5% $H_2$ $N_2$ atmosphere | 800 c | 5.5 — | 10 | | 10 | 80 | 0.3 | | 7 |
| Example 5 | | 0.21 | — | $N_2$ carrier, 5% $H_2$ $N_2$ atmosphere | 800 c | 5.5 — | 10 | | 10 | 80 | 0.3 | | 7 |
| Example 6 | | 0.33 | — | $N_2$ carrier, 5% $H_2$ $N_2$ atmosphere | 550 c | 9.0 — | 10 | | 10 | 80 | 0.3 | | 7 |
| Example 7 | $Rb_2CO_3$ & $H_2WO_4$ | — | 0.33 | $N_2$ carrier, 5% $H_2$ $N_2$ atmosphere | 800 c | 5.5 — | 10 | | 10 | 80 | 0.3 | | 7 |
| Example 8 | $Cs_2CO_2$ $Rb_2CO_3$ & | 0.03 | 0.30 | $N_2$ carrier, 5% $H_2$ $N_2$ atmosphere | 800 c | 5.5 — | 10 | | 10 | 80 | 0.3 | | 7 |
| Example 9 | $H_2WO_4$ | 0.20 | 0.13 | $N_2$ carrier, 5% $H_2$ $N_2$ atmosphere | 800 c | 5.5 — | 10 | | 10 | 80 | 0.3 | | 7 |
| Example 10 | | 0.25 | 0.08 | $N_2$ carrier, 5% $H_2$ $N_2$ atmosphere | 800 c | 5.5 — | 10 | | 10 | 80 | 0.3 | | 7 |
| Example 11 | | 0.30 | 0.03 | $N_2$ carrier, 5% $H_2$ $N_2$ atmosphere | 800 c | 5.5 — | 10 | | 10 | 80 | 0.3 | | 7 | a = Parts by mass
b = Pulverization
c = Up to room temperature

TABLE 2

| | Raw material | | | Firing | | | Dispersion condition | | | | | | |
| --- | --- | --- | --- | --- | --- | --- | --- | --- | --- | --- | --- | --- | --- |
| | | Cs/W | Rb/W | Furnace gas | Temperature | Time | Particle | Dispersant | | Organic solvent | Beads | | b |
| | Kind | Ratio | Ratio | Kind, Concentration | [° C.] | [h] | a | Kind | a | a | φ [mm] | Stirrer | [h] |
| Com. Ex. 1 | $Cs_2CO_3$ & $H_2WO_4$ | 0.15 | — | $N_2$ carrier, 5% $H_2$ $N_2$ atmosphere | 800 c | 5.5 — | 10 | Acrylic polymer dispersant | 10 | 80 | 0.3 | Paint shaker | 7 |
| Com. Ex. 2 | | 0.39 | — | $N_2$ carrier, 5% $H_2$ $N_2$ atmosphere | 800 c | 5.5 — | 10 | | 10 | 80 | 0.3 | | 7 |
| Com. Ex. 3 | | 0.23 | — | $N_2$ carrier, 5% $H_2$ $N_2$ atmosphere | 400 c | 5.5 — | 10 | | 10 | 80 | 0.3 | | 7 |

TABLE 2-continued

| | Raw material | | | Firing | | | Dispersion condition | | | | | |
|---|---|---|---|---|---|---|---|---|---|---|---|---|
| | | Cs/W | Rb/W | Furnace gas | Temperature | Time | Particle | Dispersant | | Organic solvent | Beads | | b |
| | Kind | Ratio | Ratio | Kind, Concentration | [° C.] | [h] | a | Kind | a | a | φ [mm] | Stirrer | [h] |
| Com. Ex. 4 | | 0.33 | — | N₂ carrier, 5% H₂ N₂ atmosphere | 800 c | 5.5 — | 10 | | 10 | 80 | — | Ultrasonic vibration | 10 min |
| Com. Ex. 5 | | 0.33 | — | N₂ carrier, 5% H₂ N₂ atmosphere | 800 c | 5.5 — | 10 | | 10 | 80 | 0.3 | Paint shaker | 50 |

Com.Ex. = Comparative Example
a = Parts by mass
b = Pulverization
c = Up to room temperature

TABLE 3

| | a | b | | c | TEM | d | Optical property | | | | | |
|---|---|---|---|---|---|---|---|---|---|---|---|---|
| | Dispersed | Lattice constant | | | Crystallite | | Visible light | e | f | g | h | |
| | particle size [nm] | a-axis [Å] | c-axis [Å] | c-axis/ a-axis | Size (nm) | i (nm) | Transmittance [%] | j [Point] | Transmittance [%] | Transmittance [%] | Transmittance [%] | |
| Example 1 | 70 | 7.4065 | 7.6181 | 1.0286 | 24 | 25 | 70.2 | 71.8 | 72.1 | 4.8 | 2.2 | |
| Example 2 | 70 | 7.4114 | 7.6152 | 1.0275 | 24 | 25 | 70.5 | 72.4 | 73.3 | 4.8 | 2.2 | |
| Example 3 | 70 | 7.4063 | 7.6201 | 1.0289 | 24 | 24 | 69.9 | 73.5 | 73.1 | 5.1 | 2.3 | |
| Example 4 | 70 | 7.4060 | 7.6198 | 1.0289 | 24 | 25 | 70.1 | 73.7 | 73.2 | 4.8 | 2.4 | |
| Example 5 | 70 | 7.4184 | 7.5823 | 1.0221 | 24 | 24 | 69.7 | 69.5 | 72.3 | 7.3 | 5.2 | |
| Example 6 | 70 | 7.3984 | 7.6104 | 1.0286 | 24 | 25 | 70.1 | 73.8 | 73 | 4.7 | 2 | |
| Example 7 | 70 | 7.3898 | 7.5633 | 1.0235 | 24 | 24 | 70.1 | 71.3 | 73.4 | 8 | 2.4 | |
| Example 8 | 70 | 7.3925 | 7.5730 | 1.0244 | 24 | 24 | 69.8 | 71 | 72.2 | 7.5 | 2.3 | |
| Example 9 | 70 | 7.4026 | 7.6035 | 1.0271 | 24 | 25 | 69.5 | 71.5 | 72.7 | 5.8 | 2.1 | |
| Example 10 | 70 | 7.4049 | 7.6083 | 1.0275 | 24 | 24 | 69.9 | 71.5 | 73.2 | 5.3 | 2.3 | |
| Example 11 | 70 | 7.4061 | 7.6087 | 1.0274 | 24 | 25 | 69.6 | 72.3 | 73 | 5 | 2.2 | | a = Dynamic light scattering method
b = X-ray diffraction, Rietveld method
c = Lattice anisotropy
d = In the shielding body
e = Transmittance difference
f = 500 nm wavelength
g = 1000 nm wavelength
h = 1500 nm wavelength
i = Average particle size
j = Local maxim value − local minimum value

TABLE 4

| | a | b | | c | TEM | d | Optical property | | | | |
|---|---|---|---|---|---|---|---|---|---|---|---|
| | Dispersed | Lattice constant | | | Crystallite | | Visible light | e | f | g | h |
| | particle size [nm] | a-axis [Å] | c-axis [Å] | c-axis/ a-axis | Size (nm) | i (nm) | Transmittance [%] | j [Point] | Transmittance [%] | Transmittance [%] | Transmittance [%] |
| Com. Ex. 1 | 70 | 7.4260 | 7.5900 | 1.0221 | 24 | 25 | 70.8 | 65.2 | 72.6 | 17.1 | 10.9 |
| Com. Ex. 2 | 70 | 7.3590 | 7.5802 | 1.0301 | 24 | 25 | 70.6 | 66.5 | 71.7 | 19.2 | 9.5 |

TABLE 4-continued

| | a | b | | | TEM | | Optical property | | | |
|---|---|---|---|---|---|---|---|---|---|---|
| | Dispersed | Lattice constant | | c | Crystallite | d | Visible light | e | f | g | h |
| | particle size [nm] | a-axis [Å] | c-axis [Å] | c-axis/ a-axis | Size (nm) | i (nm) | Transmittance [%] | j [Point] | Transmittance [%] | Transmittance [%] | Transmittance [%] |
| Com. Ex. 3 | 70 | 7.4947 | 7.6500 | 1.0207 | 24 | 25 | 70.2 | 60.1 | 72.6 | 25 | 15.2 |
| Com. Ex. 4 | 70 | 7.4081 | 7.6135 | 1.0277 | 130 | 125 | 70.2 | 32.4 | 73.1 | 53 | 45 |
| Com. Ex. 5 | 110 | 7.4092 | 7.6325 | 1.0301 | 9 | 41 | 69.7 | 62.3 | 72.3 | 25.9 | 15 |

Com.Ex. = Comparative Example
a = Dynamic light scattering method
b = X-ray diffraction, Rietveld method
c = Lattice anisotropy
d = In the shielding body
e = Transmittance difference
f = 500 nm wavelength
g = 1000 nm wavelength
h = 1500 nm wavelength
i = Average particle size
j = Local maxim value − local minimum value

The invention claimed is:

1. An anti-counterfeit ink composition containing composite tungsten oxide fine particles obtained through a pulverization and dispersion treatment, wherein
the composite tungsten oxide fine particles are composite tungsten oxide having a hexagonal crystal structure expressed by $M_xW_yO_z$ in which the M is at least one element of Cs and Rb, the W is tungsten, the O is oxygen, and the x, the y, and the z satisfy $0.001 \leq x/y \leq 1$ and $2.2 \leq z/y \leq 3.0$,
a lattice constant of the composite tungsten oxide fine particles after the pulverization and dispersion treatment is such that a-axis is 7.3850 Å or more and 7.4186 Å or less, and c-axis is 7.5600 Å or more and 7.6240 Å or less,
an average crystallite size of the composite tungsten oxide fine particles is 10 nm or more and 60 nm or less, and
a value obtained by subtracting the average crystallite size from an average particle size of the composite tungsten oxide fine particles is 20% or less of the average particle size.

2. The anti-counterfeit ink composition according to claim 1, wherein the lattice constant of the composite tungsten oxide fine particles after the pulverization and dispersion treatment is such that the a-axis is 7.4031 Å or more and 7.4111 Å or less, and the c-axis is 7.5891 Å or more and 7.6240 Å or less.

3. The anti-counterfeit ink composition according to claim 1, wherein a surface of each composite tungsten oxide fine particle is coated with a compound containing at least one element selected from the group consisting of Si, Ti, Al, and Zr.

4. The anti-counterfeit ink composition according to claim 1, wherein a content of a volatile component of the composite tungsten oxide fine particles is 2.5 mass % or less.

5. The anti-counterfeit ink composition according to claim 1, which contains a solvent, and/or a liquid uncured material of resin curable by energy rays.

6. An anti-counterfeit ink containing the anti-counterfeit ink composition of claim 1.

7. An anti-counterfeit printed matter including a printing section printed with the anti-counterfeit ink of claim 6.

8. The anti-counterfeit printed matter of claim 7 containing an organic binder.

9. The anti-counterfeit ink composition according to claim 1, wherein the average particle size of the composite tungsten oxide fine particles is 10 nm or more and 60 nm or less.

10. The anti-counterfeit ink composition according to claim 1, wherein
the composite tungsten oxide fine particles have an amorphous phase volume ratio of 50% or less, and
the amorphous phase is present on an outer periphery of each of the composite tungsten oxide fine particles.

11. The anti-counterfeit ink composition according to claim 1, wherein
the M is Rb in the composite tungsten oxide fine particles expressed by $M_xW_yO_z$, and
the lattice constant of the composite tungsten oxide fine particles after the pulverization and dispersion treatment is such that the a-axis is 7.3850 or more and 7.3950 or less and the c-axis is 7.5600 or more and 7.5700 or less.

* * * * *